United States Patent [19]
Dvorkis et al.

[11] Patent Number: 5,742,038
[45] Date of Patent: Apr. 21, 1998

[54] BEAM SHAPING FOR OPTICAL SCANNERS

[75] Inventors: Paul Dvorkis, Stony Brook; Edward Barkan, Miller Place; Boris Metlitsky, Stony Brook, all of N.Y.

[73] Assignee: Symbol Technologies, Inc., Holtsville, N.Y.

[21] Appl. No.: 268,982

[22] Filed: Jun. 30, 1994

Related U.S. Application Data

[63] Continuation-in-part of Ser. No. 951,562, Sep. 25, 1992, Pat. No. 5,369,264, which is a continuation-in-part of Ser. No. 592,021, Sep. 29, 1990, Pat. No. 5,218,190.

[51] Int. Cl.$^6$ ............................................... G06K 7/10
[52] U.S. Cl. ........................................... 235/462; 235/462
[58] Field of Search .............................. 235/462, 467, 235/472; 250/566, 271, 353, 204, 205

[56] References Cited

U.S. PATENT DOCUMENTS

| | | |
|---|---|---|
| 3,051,051 | 8/1962 | Jeffree . |
| 3,396,344 | 8/1968 | Broom . |
| 3,780,270 | 12/1973 | Faulkner et al. . |
| 3,790,756 | 2/1974 | Graves et al. . |
| 3,871,748 | 3/1975 | Day . |
| 4,199,816 | 4/1980 | Humphrey . |
| 4,360,798 | 11/1982 | Swartz et al. . |
| 4,369,361 | 1/1983 | Swartz et al. . |
| 4,500,776 | 2/1985 | Laser . |
| 4,508,686 | 4/1985 | Shaber et al. . |
| 4,538,895 | 9/1985 | Higgins et al. . |
| 4,555,164 | 11/1985 | Feinbloom . |
| 4,560,862 | 12/1985 | Eastman et al. ............ 235/462 |
| 4,570,057 | 2/1986 | Chadima, Jr. et al. . |
| 4,606,660 | 8/1986 | Bradshaw et al. . |
| 4,641,018 | 2/1987 | Mazumder et al. . |
| 4,652,750 | 3/1987 | Eastman et al. . |
| 4,705,939 | 11/1987 | Ulinski, Sr. . |
| 4,721,860 | 1/1988 | Troendle ...................... 250/568 |
| 4,777,357 | 10/1988 | Harada et al. . |
| 4,795,281 | 1/1989 | Ulinski, Sr. et al. . |
| 4,820,911 | 4/1989 | Arackellian et al. ............ 235/467 |
| 4,822,986 | 4/1989 | Guthmueller et al. . |
| 4,825,048 | 4/1989 | Poland . |
| 4,826,269 | 5/1989 | Streifer et al. . |
| 4,860,226 | 8/1989 | Martin et al. . |
| 4,894,790 | 1/1990 | Yotsuya et al. . |
| 4,896,026 | 1/1990 | Krichever et al. . |
| 4,916,298 | 4/1990 | Raphael . |
| 4,933,538 | 6/1990 | Heiman et al. . |
| 4,980,544 | 12/1990 | Winter . |

(List continued on next page.)

FOREIGN PATENT DOCUMENTS

| | | |
|---|---|---|
| 0 385 478 | 5/1990 | European Pat. Off. . |
| 55-88172 | 7/1980 | Japan . |
| 0093871 | 4/1989 | Japan . |
| 0198175 | 8/1991 | Japan . |
| WO 93/18478 | 9/1993 | WIPO . |

OTHER PUBLICATIONS

"Quick Check 500" Brochure, Photographic Sciences, 2 pages, 1989 no month.
Barkan, Automatic I.D. News, "Author Verifies the Key to Bar Codying Success", (Nov. 1988).
Grabowski, et al., "Code Reading Mechanical Scanning Gun", IBM Technical Disclosure Bulletin, vol. 5, No. 5 Oct. 1962.

*Primary Examiner*—Donald T. Hajec
*Assistant Examiner*—Karl Frech
*Attorney, Agent, or Firm*—Fish & Richardson P.C.

[57] ABSTRACT

An optical scanner such as a bar code scanner includes a laser diode to create the scanning laser beam. Laser diodes are characteristically astigmatic, and when passed through a rotationally symmetric lens the beam typically forms a waist both in the x (scanning) direction and in the y (perpendicular) direction. The width of the beam envelope in the x direction is adjusted by means of a conventional lens. The width of the beam envelope in the y direction is adjusted by the use of a non-planar mirror, preferably a cylindrical mirror, as the rotating or oscillating element.

14 Claims, 4 Drawing Sheets

U.S. PATENT DOCUMENTS

| | | |
|---|---|---|
| 4,992,649 | 2/1991 | Mampe et al. . |
| 5,013,895 | 5/1991 | Iggulden et al. . |
| 5,014,831 | 5/1991 | Eastman et al. .................. 235/462 |
| 5,034,904 | 7/1991 | Moy . |
| 5,047,617 | 9/1991 | Shepard et al. . |
| 5,064,258 | 11/1991 | Inokuchi et al. . |
| 5,067,093 | 11/1991 | Przybylowicz et al. . |
| 5,073,954 | 12/1991 | Van Tyne et al. . |
| 5,081,639 | 1/1992 | Synder et al. . |
| 5,115,334 | 5/1992 | Tomita . |
| 5,170,277 | 12/1992 | Bard et al. ......................... 35/462 |
| 5,194,720 | 3/1993 | Reinnagel et al. . |
| 5,200,597 | 4/1993 | Eastman et al. .................. 235/467 |
| 5,218,190 | 6/1993 | Hardesty et al. . |
| 5,229,591 | 7/1993 | Heiman et al. . |
| 5,235,167 | 8/1993 | Dvorkis et al. . |
| 5,250,791 | 10/1993 | Heiman et al. . |
| 5,280,161 | 1/1994 | Niwa . |

BEAM SHAPING FOR OPTICAL SCANNERS

CROSS-REFERENCE TO RELATED APPLICATIONS

This application is a continuation-in-part of previously filed U.S. patent application Ser. No. 07/951,562, filed Sep. 25, 1992 now U.S. Pat. No. 5,369, 264, which is a continuation-in-part of previously filed U.S. patent application Ser. No. 07/592,021 filed Sep. 28, 1990 now U.S. Pat No. 5,218,790.

BACKGROUND OF THE INVENTION

1. Field of the Invention

The invention relates generally to optical scanners, and in particular to a scanner in which means are provided for shaping the scanning beam both in the direction of the scan and in the perpendicular direction.

2. Description of Related Art

Optical scanners such as bar code scanners typically make use of light from laser diodes which is moved to provide the scanning beam. Such diodes are robust and relatively inexpensive, but they do suffer from the disadvantage that the beam emerging from a laser diode is astigmatic. The astigmatic laser diode can be characterized as having two apparent light sources spaced apart of each other along the optical path. One of the light sources emits light in a horizontal plane, appears to be coming from inside the laser diode chip, and has a low angular divergence. The other apparent light source emits light in a vertical plane, appears to be coming from a facet of the chip, and has a high angular divergence. These two apparent light sources, which are spaced apart from each other by typically about 20 micrometres, form two beam waists in different planes and in different directions, as measured relative to the planar junction of the chip.

A typical laser beam, showing these effects, is illustrated in FIG. 6. In that Figure, a beam 34 is shown emerging from a laser diode 33. The beam then passes through a focusing lens 32 and a shaping aperture 45 before impinging upon a surface 102 which carries a bar code symbol 100 to be read. As will be evident, the particular laser beam shown is asymmetric, with the shape of the beam cross-section depending upon distance from the light source z. At relatively small distances, such as d1, the beam is relatively wide in the x direction, the beam width gradually reducing with distance until the width becomes a minimum at distance d3. The width then gradually starts to increase again at the greater distances d4, d5 and d6. The beam is "waisted" in the x direction, with the "waist" occurring at approximately d3.

Similarly, the beam is likewise waisted in the y direction. At small distances such as d1, the height of the beam is relatively large. As the distance increases the height gradually reduces until the height reaches a minimum at approximately d4. At greater distances, such as d5 and d6 the height gradually increases again.

This example illustrates the fact that the x and y "waists" need not necessarily occur at the same distance from the light source.

When a bar code symbol is to be scanned (in the x direction) it is generally desirable for the beam width to be relatively small at the point at which it impinges upon the bar code symbol, to provide proper discrimination between the bars and spaces. On the other hand, it is desirable that the y dimension (perpendicular to the scanning direction) is relatively large to minimise problems due to noise. Typical noise includes the effects of laser speckle, incomplete printing of individual bars within the bar code symbol, and other printing artifacts such as the dots produced when a bar code symbol is printed out using a dot matrix printer.

Various approaches have been used in the past to mitigate the difficulties caused by the beam waist in the y direction. Canadian patent CA-A-1324442, in common ownership with the present application, teaches that under certain circumstances one need not compensate for laser astigmatism, but that one can instead use it for a positive purpose, that is to enhance visibility. Other prior art documents such as U.S. Pat. No. 4,253,735 (Kawamura et al), U.S. Pat. No. 5,081,639 (Snyder et al) and U.S. Pat. No. 4,538,895 (Higgins et al) disclose that one can to some extent correct the astigmatism using appropriately shaped cylindrical lenses. This type of arrangement is however relatively expensive since additional costly optical elements are necessary. Furthermore, the additional optical elements must be very carefully and precisely mounted, thereby tending to increase manufacturing costs.

It is also known to provide some beam shaping in the y direction by providing an aperture stop in the beam. Although this is relatively inexpensive, it does not result in the desired aim of eliminating the y-direction "waist".

SUMMARY OF THE INVENTION

1. Objects of the Invention

It is an objection of the present invention at least to alleviate the problems of the prior art.

It is a further object to provide a simple and inexpensive means of adjusting the beam profile (height at a particular distance from the light source) as desired in the y direction.

2. Features of the Invention

According to the present invention there is provided an optical scanner for scanning indicia:

The scanner includes an optical scanner for scanning indicia. The scanner comprises a light source producing a light beam that converges in both x and y directions so that the beam has a waist in both x and y directions, where x and y are orthogonal directions and a scanning element mounted for scanning motion. The scanning element is positioned to receive the light beam and reflect the beam in a scanning motion along the x direction across the indicia. The scanning element includes a beam shaping surface shaped to cause divergence of the light beam in the y direction. The divergence is sufficient to at least reduce the convergence of the beam in the y direction so that the beam leaving the scanning element has a waist in the x direction and does not have a waist in the y direction. The light source is a laser source module comprising a laser diode, a focusing lens, and a beam shaping aperture. The beam shaping surface of the scanning element is a convex mirror surface.

With an arrangement of this type, beam shaping may be carried out by the rotating and/or oscillating scanning means, thereby obviating the need to have separate stationary asymmetric beam shaping elements such as additional cylindrical lenses. The stationary optical elements within the scanner can therefore be kept simple. By having the scanning mirror shape the beam in the y direction, the invention gives the designer effective independent control both of the x and y dimensions of the scanning laser spot at the expected working distance.

Figure 2:
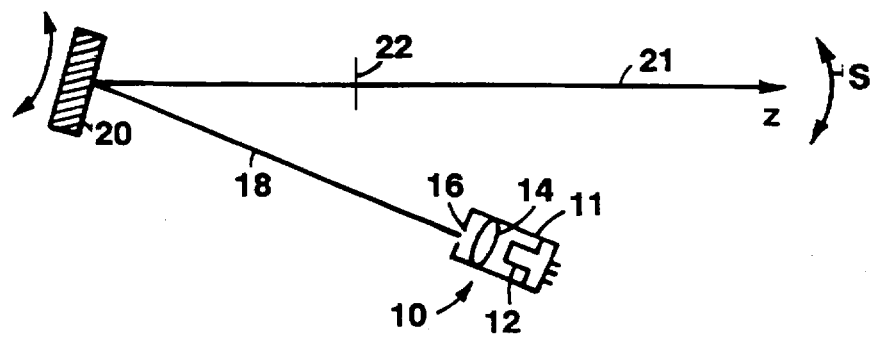
FIG. 2 illustrates a typical prior art scanner giving rise to the beam profiles of FIG. 1.

DETAILED DESCRIPTION OF THE PREFERRED EMBODIMENTS:

Details of a typical prior art bar code scanner are shown in FIG. 2. A laser module 10 has a housing 11 within which is secured a laser diode 12 and a focusing lens 14. Light from the diode 12 passes through the lens 14 and emerges from the housing 11 via a beam shaping aperture 16 as an outgoing beam 18. The beam 18 impinges upon a rotating or oscillating scan mirror 20 from which it is reflected to form a scanning beam 21. Because of the oscillation or rotation of the mirror 20 the beam 21 scans back and fourth across an indicia to be read (not shown) in the direction of the arrows s. Light is reflected back from the indicia to a photodetector (not shown), the features of the indicia being determined by the changing output of the photodetector as the scanning beam 21 scans across the indicia.

Because of the astigmatism of the laser diode 12, the beam 18 and hence the scanning beam 21 is not entirely rotationally symmetric. FIG. 1 shows how the x and y profiles of the beam vary with the distance (z) from the scanner. In this diagram, the x direction represents the scanning direction of the beam 21, and the y direction the direction mutually perpendicular to x and z. The line 22, in FIGS. 1 and 2, represents schematically the position of the nose or window of the optical scanner: accordingly, it will be understood that FIG. 1 shows the profiles of the laser beam in the region outside the scanner.

Figure 1A:
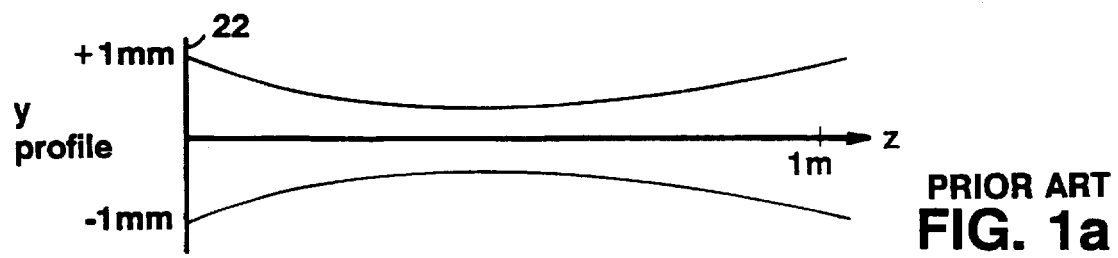
FIG. 1 illustrates the X and Y beam profiles of a typical prior art scanner.
Figure 1B:
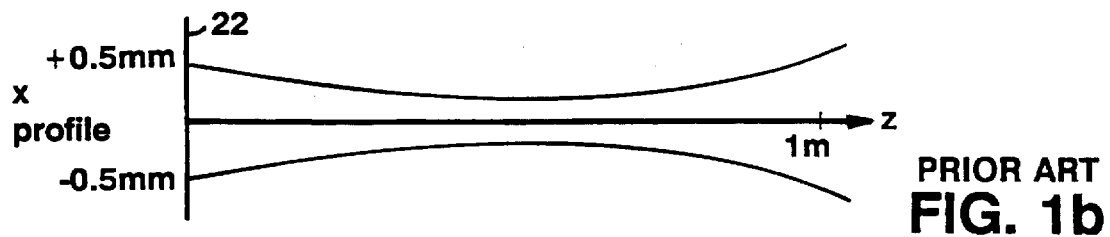

The x profile shown in FIG. 1(b) may be controlled by altering the characteristics of the lens 14. The strength of the lens may be chosen so that the beam width in the x direction is optimised for the type of indicia to be scanned, and the expected distance (z) between the indicia and the scanner. The y beam profile, on the other hand, shown in FIG. 1(a) is primarily determined by the laser astigmatism and to some extent by the dimensions of the aperture 16. However, it is normally found in practice, depending upon the laser orientation, that the y profile has a smaller dimension (or "waist") somewhere within the working range. This is undesirable, since one generally wants to have a width in the y direction which is quite large (typically 1.5 to 2 mm), to minimise the effects of noise.

Figure 4:
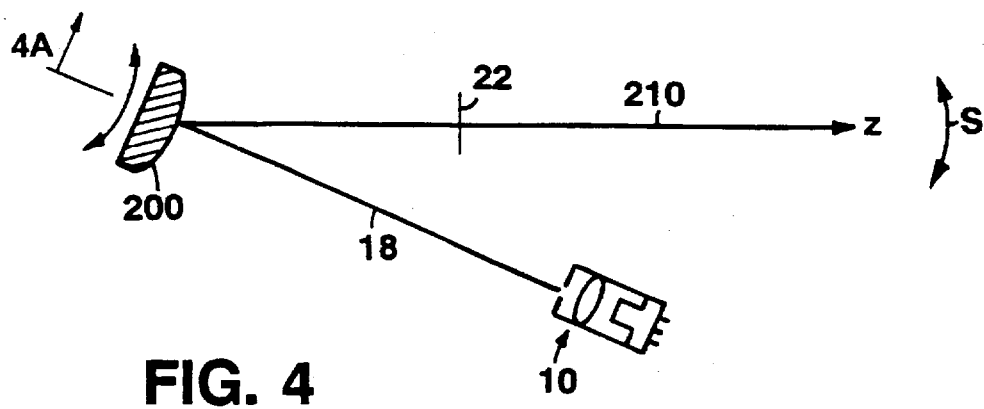
FIG. 4 shows a scanner embodying the present invention and which produces the beam profiles shown in FIG. 3.
Figure 4A:
FIG. 4A is a cross section along section 4A—4A through the lens shown in FIG. 4. The convex cylindrical shape of the lens appears in this cross sectional view.

Turning now to FIG. 4, a scanning arrangement is shown which embodies the present invention. Corresponding reference numerals are used to those already used in FIG. 2. In the embodiment of FIG. 4, the plane scan mirror 20 is replaced by a shaped mirror 200, preferably a part-cylindrical mirror. The mirror 200 either oscillates or rotates to produce a shaped scanning laser beam 210.

The element 200 need not be a cylindrical mirror, but could instead be any other type of beam shaping means, mounted for rotation or oscillation, which is arranged to shape the beam asymmetrically in the x and y directions. The element 200 could, for example, be a rotationally asymmetric lens with appropriate other optical elements so that on rotation and/or oscillation the stationary laser beam 18 is converted into the shaped scanning beam 210.

Figure 3A:
FIG. 3 shows the preferred beam profiles as produced by a scanner embodying the present invention.
Figure 3B:
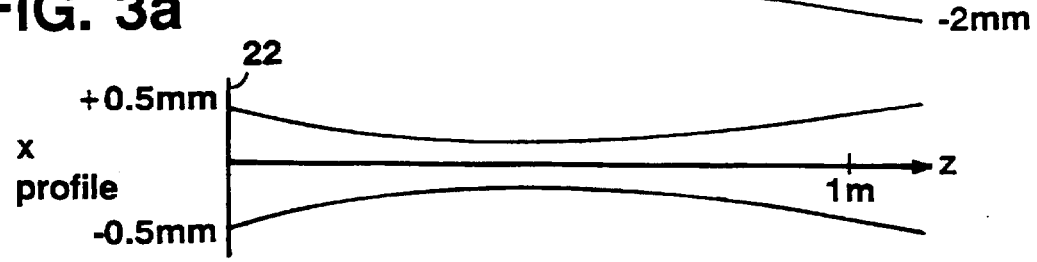

The x and y profiles of the shaped beam 210 are shown in FIG. 3. The x profile of FIG. 3(b) is identical with the prior art x profile of FIG. 1(b). However, the y profile is very different. By introducing the cylindrical scan mirror 200 the width of the beam in the y direction has been increased, and the "waist" eliminated entirely, or at least moved a long distance away in comparison with the expected working distance.

By a suitable choice of curvature for the mirror 200 the y beam profile can be adjusted as desired, independently of the x profile.

Figure 5:
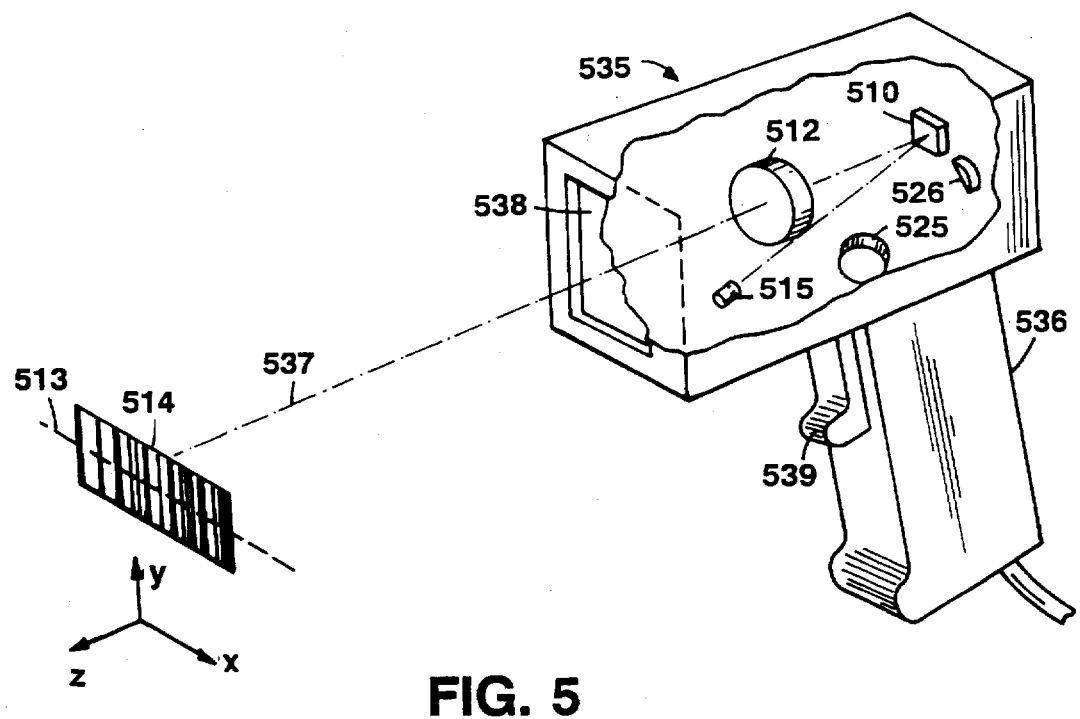
FIG. 5 shows an exemplary hand-held scanner within which the embodiment of FIG. 4 may be incorporated.
Figure 6:
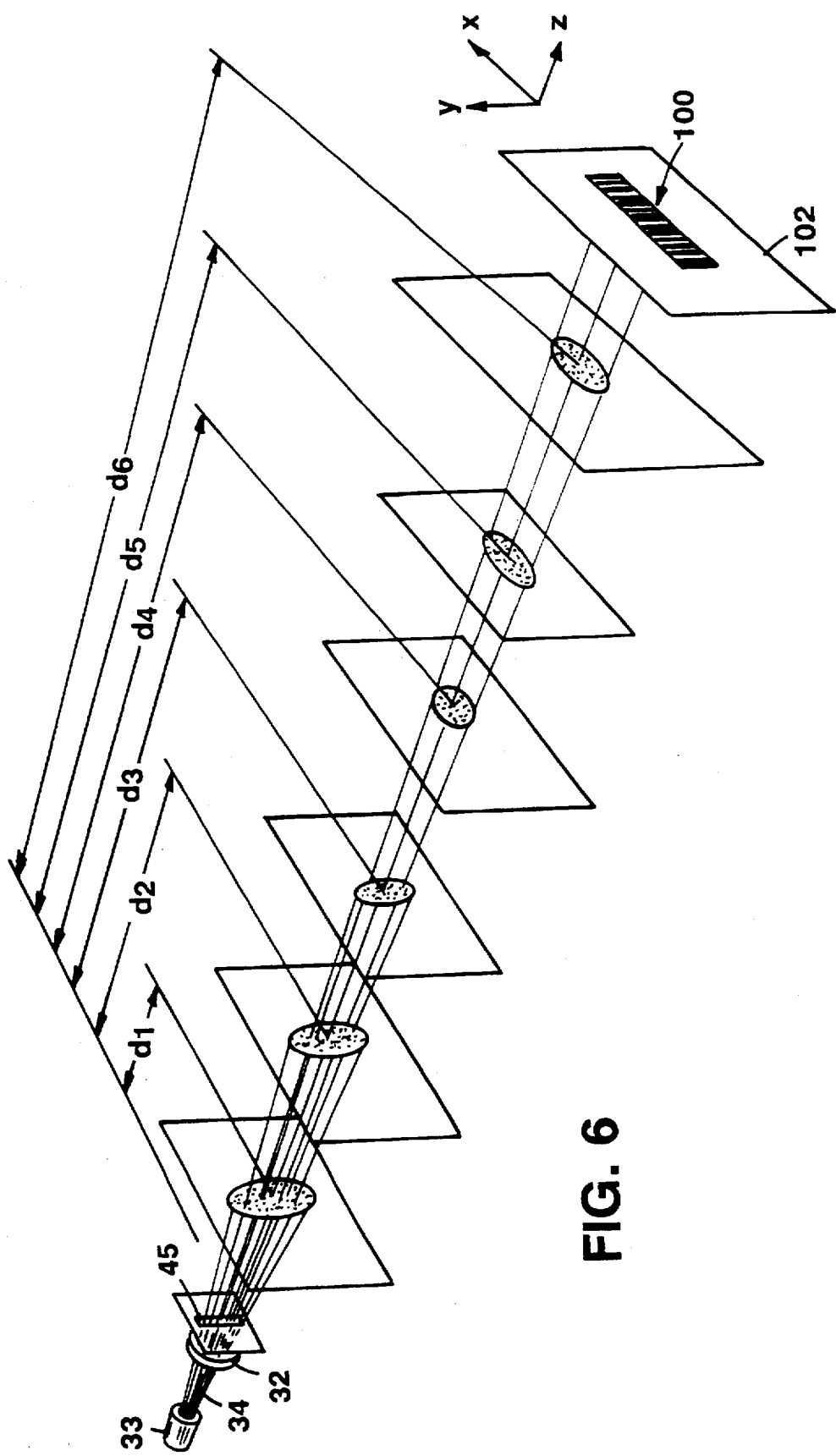
FIG. 6 shows a typical laser beam having two apparent light sources.

FIG. 5 illustrates, as an example, a suitable type of hand-held laser scanner into which the present embodiment can be incorporated. The scanner comprises a main body 535 having a graspable hand portion 536 which carries a trigger 539. Within the body 535 is a laser module 515, which may for example be identical with the laser module 10 shown in FIG. 4. Light from the laser module 515 is arranged to shine onto an oscillating mirror 510 (which is preferably a convex mirror such as the mirror 200 in FIG. 4). The resulting beam 537 passes through a lens 512, and out of the housing via a window 538. The mirror 510 is arranged to oscillate in such a way that the beam 537 traces out a scan line 513 across an indicia 514 to be recorded. Light reflected back from the indicia passes through the window 538, is collected by a collecting mirror 526, and is reflected back to a photodetector 525. The optical signal is then converted into an electrical signal, and the features of the indicia 514 determined. In this exemplary embodiment, of course, the mirror 510 is profiled to provide y-axis beam shaping, and is preferably cylindrical.

While the invention has been illustrated and described with reference to one particular embodiment, it is not intended to be limited to any of the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the stand point of prior art, fairly constitute essential characteristics of the generic or specific aspects of this invention and, therefore, such adaptations should and are intended to be comprehended within the meaning and range of equivalents of the following claims.

What is claimed as new and desired to be protected by Letters Patent is set fourth in the appended claims:

1. An optical scanner for scanning indicia, said scanner comprising:

a light source producing a light beam that converges in both x and y directions so that the beam has a waist in both x and y directions, where x and y are orthogonal directions; and a scanning element mounted for scanning motion, said scanning element positioned to receive said light beam and reflect said beam in a scanning motion along the x direction across the indicia, said scanning element including a beam shaping surface shaped to cause divergence of the light beam in the y direction, said divergence being sufficient to remove the convergence of the beam in the y direction so that the beam leaving the scanning element has a waist in the x direction and does not have a waist in the y direction wherein the light source is a laser source module comprising a laser diode, a focusing lens, and a beam shaping aperture, wherein the beam shaping surface of the scanning element is a convex mirror surface.

2. The optical scanner of claim 1 wherein the convex mirror surface is substantially cylindrical about an axis extending in the x direction so as to produce divergence of light in the y direction.

3. The optical scanner of claim 2 wherein said beam shaping surface is a convex mirror surface.

4. The optical scanner of claim 1 wherein said light beam leaving said scanning element emerges from said scanner without further beam shaping.

5. The optical scanner of claim 1 wherein the light beam emerging from said light source is rotationally asymmetric.

6. An optical scanner for scanning indicia, said scanner comprising:

a laser source module comprising a laser diode, a focusing lens, and a beam shaping aperture, said laser source module configured to produce a light beam that converges in both x and y directions so that the beam has a waist in both x and y directions, were x and y are orthogonal directions; and a mirror scanning element mounted for scanning motion, said mirror scanning element positioned to receive said light beam and reflect said beam in a scanning motion along the x direction across the indicia, said mirror scanning element including a convex mirror surface shaped to diverge light in the y direction to at least reduce convergence of the beam in the y direction.

7. The optical scanner of claim 6 wherein the convex mirror surface is substantially cylindrical about an axis extending in the x direction so as to produce divergence of light in the y direction.

8. The optical scanner of claim 6 wherein said light beam leaving said scanning element emerges from said scanner without further beam shaping.

9. The optical scanner of claim 6 wherein the light beam emerging from said light source is rotationally asymmetric.

10. An optical scanner for scanning indicia, said scanner comprising:

a light source producing a light beam that converges in both x and y directions so that the beam has a waist in both x and y directions, where x and y are orthogonal directions; and a scanning element mounted for scanning motion, said scanning element positioned to receive said light beam and reflect said beam in a scanning motion along the x direction across the indicia, said scanning element including a beam shaping surface shaped to diverge light in the y direction to at least reduce convergence of the beam in the y direction, wherein said light beam leaving said scanning element emerges from said scanner without further beam shaping, wherein the light source is a laser source module comprising a laser diode, a focusing lens, and a beam shaping aperture wherein the beam shaping surface of the scanning element is a convex mirror surface.

11. The optical scanner of claim 10 wherein the convex mirror surface is substantially cylindrical about an axis extending in the x direction so as to produce divergence of light in the y direction.

12. The optical scanner of claim 11 wherein said beam shaping surface is a convex mirror surface.

13. The optical scanner of claim 10 wherein said beam shaping surface is a convex mirror surface.

14. The optical scanner of claim 10 wherein the light beam emerging from said light source is rotationally asymmetric.

* * * * *

UNITED STATES PATENT AND TRADEMARK OFFICE
CERTIFICATE OF CORRECTION

PATENT NO. : 5,742,038

DATED : April 21, 1998

INVENTOR(S) : Paul Dvorkis, Edward Barkan, and Boris Metlitsky

It is certified that error appears in the above-identified patent and that said Letters Patent is hereby corrected as shown below:

Cover page, Related U.S. Application Data, [63] "Sep. 29, 1990" should be --Sep. 28, 1990--.

Cover page, [56] References Cited, OTHER PUBLICATIONS, in the Barkan citation, "Codying" should be --Coding--.

Cover page 2, [56] References Cited, U.S. PATENT DOCUMENTS, "5,014,831" should be --5,015,831--.

Cover page 2, [56] References Cited, U.S. PATENT DOCUMENTS, at 5,081,639, "Synder" should be --Snyder--.

Column 1, line 7, "5,369, 264" should be --5,369,264--.

Column 2, line 1, "minimise" should be --minimize--.

Column 3, line 46, "optimised" should be --optimized--.

UNITED STATES PATENT AND TRADEMARK OFFICE
CERTIFICATE OF CORRECTION

PATENT NO. : 5,742,038

DATED : April 21, 1998

INVENTOR(S) : Paul Dvorkis, Edward Barkan, and Boris Metlitsky

It is certified that error appears in the above-identified patent and that said Letters Patent is hereby corrected as shown below:

Column 3, line 56, "minimise" should be --minimize--.

Column 4, line 53, "fourth" should be --forth--.

Column 5, line 27, "were" should be --where--.

Signed and Sealed this

Twenty-fifth Day of August, 1998

Attest:

BRUCE LEHMAN

Attesting Officer

Commissioner of Patents and Trademarks